United States Patent
Martin et al.

(10) Patent No.: US 10,956,716 B2
(45) Date of Patent: Mar. 23, 2021

(54) METHOD FOR BUILDING A COMPUTER-IMPLEMENTED TOOL FOR ASSESSMENT OF QUALITATIVE FEATURES FROM FACE IMAGES

(71) Applicant: CHANEL PARFUMS BEAUTE, Neuilly sur Seine (FR)

(72) Inventors: Victor Martin, Pantin (FR); Renaud Seguier, Cesson (FR); Aurélie Porcheron, Pantin (FR)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 75 days.

(21) Appl. No.: 16/284,356

(22) Filed: Feb. 25, 2019

(65) Prior Publication Data

US 2019/0266386 A1    Aug. 29, 2019

(30) Foreign Application Priority Data

Feb. 28, 2018    (EP) .................................... 18305211

(51) Int. Cl.
*G06K 9/00*        (2006.01)
*G06K 9/62*        (2006.01)
(Continued)

(52) U.S. Cl.
CPC ......... *G06K 9/00275* (2013.01); *G06F 17/18* (2013.01); *G06K 9/00288* (2013.01);
(Continued)

(58) Field of Classification Search
CPC ............. G06K 9/00275; G06K 9/6273; G06K 9/6256; G06K 9/4628; G06K 9/00288; G06F 17/18; G06N 3/0472; G06N 5/04
See application file for complete search history.

(56) References Cited

U.S. PATENT DOCUMENTS 10,482,333  B1 *  11/2019  el Kaliouby ............ G16H 20/70
2011/0222724  A1 *  9/2011  Yang ..................... G06K 9/4628
                                                                382/103
(Continued)

FOREIGN PATENT DOCUMENTS

EP            2919142 A1       9/2015
JP         2009172181 A        8/2009
JP         2013050927 A        3/2013

OTHER PUBLICATIONS

Zakarya Qawaqneh et al : "Depp Convolution Neural Network for Age estimation based on VGG-Face Model". XP55502175 (Year: 2017).*

(Continued)

*Primary Examiner* — Asghar H Bilgrami
(74) *Attorney, Agent, or Firm* — Nixon & Vanderhye

(57) ABSTRACT

Disclosed is a method for building a neural network tool to determine, by processing a picture of a human face, a score representative of a qualitative feature of the face, including performing a training session of an initial neural network to assess, from the picture, an estimated age of the person. The initial neural network includes layers of neurons and associated weights, and each training session is performed on a first database of face images with associated ages, and each training session outputs an updated version of the neural network with adjusted weights. For each updated version of the initial neural network corresponding to a training session, evaluating an error of part of the initial neural network on another database of images with each associated with a reference score representing the qualitative feature, selecting the part of the initial neural network in the updated version corresponding to the minimum.

11 Claims, 5 Drawing Sheets

(51) Int. Cl.
  *G06K 9/46* (2006.01)
  *G06F 17/18* (2006.01)
  *G06N 3/04* (2006.01)
  *G06N 5/04* (2006.01)
  *G06N 3/08* (2006.01)

(52) U.S. Cl.
  CPC ......... *G06K 9/4628* (2013.01); *G06K 9/6256* (2013.01); *G06K 9/6273* (2013.01); *G06N 3/0472* (2013.01); *G06N 5/04* (2013.01); *G06N 3/08* (2013.01)

(56) References Cited

U.S. PATENT DOCUMENTS

| | | | |
|---|---|---|---|
| 2015/0157243 A1 | 6/2015 | Do et al. | |
| 2018/0107866 A1* | 4/2018 | Li | G06K 9/00268 |
| 2018/0303397 A1* | 10/2018 | Krupat | A61B 5/18 |
| 2018/0352150 A1* | 12/2018 | Purwar | H04N 5/23293 |
| 2019/0172458 A1* | 6/2019 | Mishra | G10L 15/16 |
| 2020/0184278 A1* | 6/2020 | Zadeh | G06F 16/953 |

OTHER PUBLICATIONS

Yang Bin el al: "Convolution Channel Features", IEEE International Conference on Computer vision (ICCV), XP032866323 (Year: 2015).*

European Search Report dated Aug. 27, 2018, in copending European Application EP 18 30 5211.7.

Zakariya Qawaqneh et al: "Deep Convolutional Neural Network for Age Estimation based on VGG-Face Model", Sep. 5, 2017 (Sep. 5, 2017). XP55502175. Retrieved from the Internet: URL:https://arxiv.org/ftp/arxiv/papers/1709/1709.01664.pdf , Bridgeport CT, USA.

Yang Bin et al: "Convolutional Channel Features", 2015 IEEE International Conference on Computer Vision (ICCV). IEEE Dec. 7, 2015 (Dec. 7, 2015). pages 82-90. China, XP032866323. DOI: 10.1109/ICCV.2015.18.

* cited by examiner

METHOD FOR BUILDING A COMPUTER-IMPLEMENTED TOOL FOR ASSESSMENT OF QUALITATIVE FEATURES FROM FACE IMAGES

FIELD OF THE INVENTION

The invention relates to a method for building a computer-implemented tool for the assessment of a qualitative feature such as the perceived health, from a picture of a face of a person, and to the tool obtained with said method.

BACKGROUND OF THE INVENTION

A lot of research is focused on understanding which facial cues alter the perception of qualitative features such as the perception of health. To perform this research, researchers gather health perception ratings from faces, before pointing objective difference in facial cues that can explain the difference in health perception ratings.

However, gathering health ratings from humans for faces is a costly and time-consuming task. Indeed, it requires submitting each face image to a panel of raters of a significant size, each rater indicating a health rating, and then computing for each face an average health rating of all the ratings given.

As a consequence, the databases of face images associated with health ratings are very small. This brings about a number of issues. First, the small size of the databases makes it difficult for the researchers to obtain relevant and reliable statistical results.

Second, it would be desirable to train an artificial intelligence tool such as a neural network, to output health ratings from new images, in order to enrich existing databases. However, the existing databases are too small to train such a tool. Indeed, the minimum size of a database for performing learning of a neural network is typically of at least several thousands of images, up to hundreds of thousands of images, whereas the size of the available databases of images and health ratings is about several hundreds of pictures at most.

There is therefore a need for a tool allowing the automatic assessment of qualitative features such as health perception from face images, in order to better understand the phenomenon of health perception, and to enrich the databases used by the researchers.

PRESENTATION OF THE INVENTION

The invention aims at solving the above problem, by providing a method for building a tool allowing the automatic assessment of qualitative features from face images, despite a very small size of the databases currently available.

Another aim of the invention is to allow enriching the currently available databases with limited time and resources.

To this end, the invention discloses a method for building a tool adapted to determine, from the processing of a picture of a human face, a score representative of a qualitative feature of the face, the tool comprising a neural network, wherein the method is performed by a computer and comprises steps of:

performing at least one training session of an initial neural network configured to assess, from a picture of a face of a person, an estimated age of the person, wherein the initial neural network comprises layers of neurons and associated weights, and each training session is performed on a first database of face images in which each face image is associated with a biological age of the person on the image, and each training session outputs an updated version of the neural network in which the weights are changed, for each updated version of the initial neural network corresponding to a training session, evaluating an error of a part of the initial neural network on a second database of face images in which each face image is associated with a reference score representative of the qualitative feature, the second database having a size inferior to the first database, selecting as the neural network of the tool said part of the initial neural network in the updated version corresponding to the minimum evaluated error over the errors evaluated from all the updated versions.

Preferably, the initial neural network comprises a feature extraction part, configured to extract features from a picture of a face, and an age evaluation part, configured to output an estimated age from the extracted features, and the part of the initial neural network which error is evaluated and which is selected as neural network for the tool is the feature extraction part.

In embodiments, the step of error evaluation comprises training a linear regression between an output of the part of the initial neural network for a face image and the score associated to the image.

In a preferred embodiment, the training of the linear regression is performed by a k-fold cross-validation. The parameter k may is comprised between 2 and N, where N is the number of images in the second database.

Preferably, the method further comprises, once the neural network of the tool is selected, a step of selecting an estimator among a plurality of estimator candidates, which minimizes an average error, between a score estimated by the estimator and the corresponding reference score for each image of the second database.

In an embodiment, each estimator candidate is trained with a k'-fold configuration.

The estimator candidates may comprise at least one of a linear regression, a Ridge regression, a Lasso regression, or a neural network.

The qualitative feature may be one among the following: health estimation, attractiveness estimation, gender estimation, self-confidence estimation, and femininity estimation.

According to another object of the invention, a computer program product is disclosed, comprising a set of instructions for performing the method disclosed above, when executed by a processor.

According to another object of the invention, a tool for assessment of a qualitative feature from a picture of a human face is disclosed, the tool comprising a neural network adapted to process the picture to extract features, and an estimator adapted to infer, from the extracted features, a score representative of the qualitative feature, characterized in that it is built according to the method recited above.

According to another object of the invention, a computer-implemented method is disclosed for assessing a qualitative feature from a picture of a human face, comprising the application, to the picture, of a tool recited previously to output a score representative of the qualitative feature.

In embodiments, the picture is a face image built from parts of images of the second database, and the method further comprises adding the picture and corresponding score to the second database.

The method according to the invention allows building a tool for assessing a qualitative feature, such as health perception, from a human face. The method circumvents the issue of the limited size of the available databases, by training an initial network, dedicated to age estimation, on a first database of greater size, this database comprising pictures of faces associated with the age of the person shown on the picture. This kind of database is much easier to obtain, and hence much bigger, because there is no need to have each picture of the database reviewed to assign the age.

The method then extracts a part of the trained network which is dedicated to feature extraction from a face image. This part forms the neural network of the tool for assessing qualitative feature. Indeed, feature extraction from a face image also has to be performed prior to evaluate health or any other qualitative feature.

In order to ensure that the extracted neural network is relevant for assessment of a qualitative feature, the version of the trained network which is selected is that which provides the best decision regarding the assessment of the qualitative feature, by k-fold cross-validation on the more limited database of face images associated with a score representative of the qualitative feature.

Therefore the method compensates the lack of data available for training a neural network by using another network trained on another, larger, database.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST AN EMBODIMENT OF THE INVENTION

Figure 1:
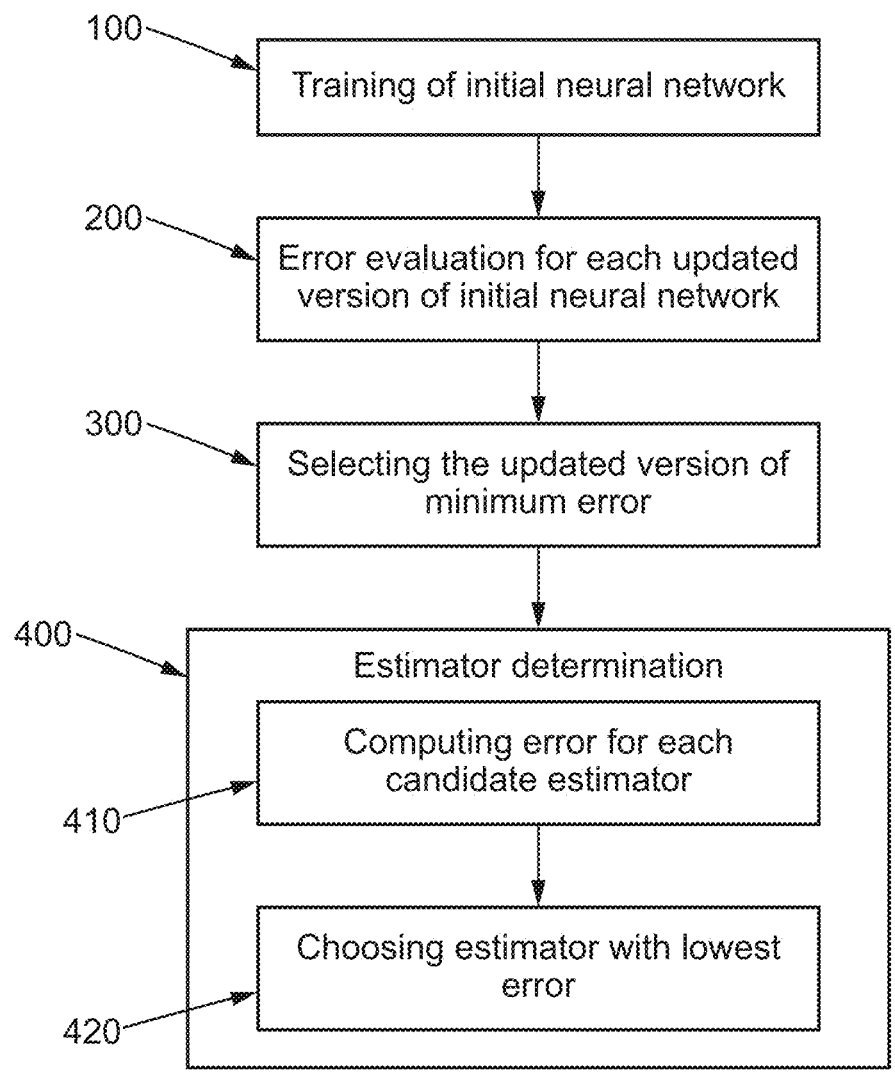
FIG. 1 schematically shows the main steps of a method according to an embodiment.

With reference to FIG. 1, a method for building a tool for automatic assessment of a qualitative feature from a picture of a human face will now be described.

This method is implemented by a computer comprising at least a calculator which can be a processor, a microprocessor, a controller, or any other equivalent device, and a memory storing instructions to be executed by the calculator for performing the method. The memory may also store the first and second databases which will be detailed hereinafter. Alternatively, the first and second databases may be stored in a distinct memory (for instance, in remote server), which may be accessible by the computer, for example through a telecommunication network such as the Internet and a corresponding network interface on the computer.

Preferably, the qualitative feature is health perception. In other embodiments, the qualitative feature may be femininity, gender, attractiveness or else self-confidence estimation.

The tool built according to the method is also implemented by computer. It receives as an input a picture of a human face and outputs a score representative of the qualitative feature to be assessed.

Figure 5:
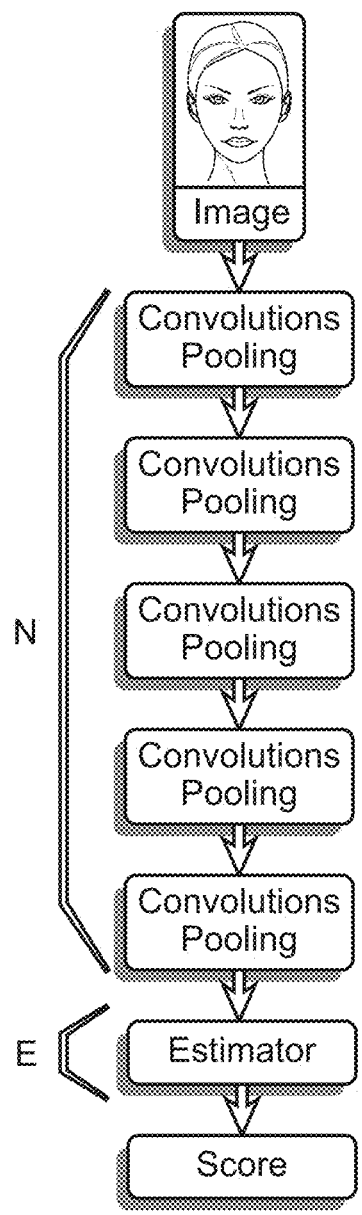

As shown in FIG. 5, the tool built according to the method comprises a neural network, which is configured to process a picture of a human face to extract features, and an estimator, which is configured to process the extracted features to output the desired score.

As indicated previously, a neural network cannot be trained on a too small database such as a database comprising face images associated with perceived health scores, such database comprising at most some hundreds of images and respective scores.

To circumvent this problem, back to FIG. 1, the method comprises a first step 100 of training an initial neural network of a first database, the first database comprising images of human faces, each image being associated to the age of the person shown on the image. This database preferably comprises at least 10.000 images and associated ages, and even more preferably about at least 100.000 images and associated ages.

The initial neural network is a network configured to output, from an image of human face, an estimated age of the person shown on the image. To this end, as schematically shown on FIG. 2, the initial neural network comprises a feature extraction part FP which is adapted to extract, from a picture, a series of features, and an age evaluation part EP, which receives the extracted features as an input and outputs the estimated age.

As well known by the skilled person, the initial neural network comprises layers of neurons, each neuron being connected to other neurons from other layers and using weights to process its inputs.

Figure 2:
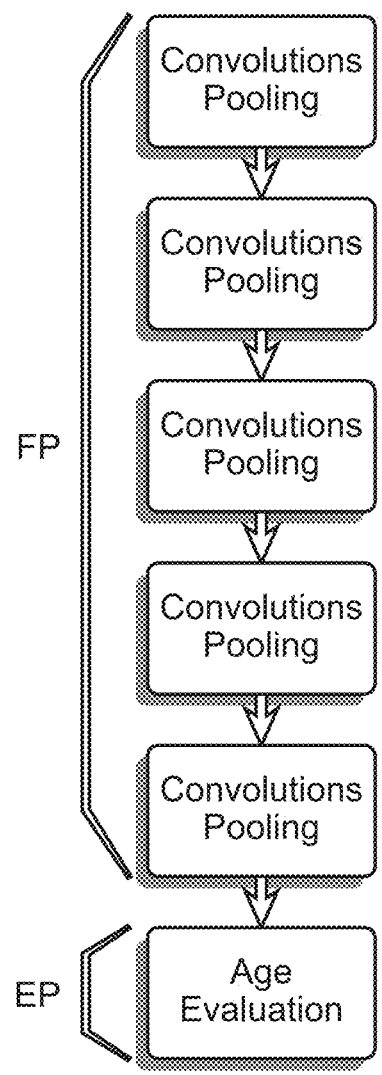
FIG. 2 is a schematic view of an initial neural network configured to output an estimated age from a face image.

As shown schematically on FIG. 2, the feature extraction part FP of the initial neuron network may comprise a number of blocks, each block comprising at least one convolutional layer adapted to perform a filter on the input image, and a pooling layer.

According to a preferred, yet non limiting embodiment, the initial neural Network may be the VGG-16 neural network. This neural network is a readily available network used for object classification. Even more preferably, the initial neural network may be a modified version of the VGG-16 neural network, wherein the modification comprises the reduction of neurons in the age evaluation part. Therefore the learning effort is focused on the feature extraction part rather than on the age evaluation part, and thus the initial neural network is prevented from using too much the evaluation part EP, as this part will be removed in a next step.

The training step 100 comprises performing a plurality of training sessions, also known as epochs, of the initial neural network on the first database, each training session comprising a modification of the weights of the neurons of the network and outputting an updated version of the initial neural network.

In the example given above, the modified VGG-16 network can be trained with Stochastic Gradient Descent with a learning rate of 10-4 on 600 epochs with 10 steps per epochs (i.e. 10 learning iterations, each learning iteration implying modifications of the neuronal weights).

Figure 3:
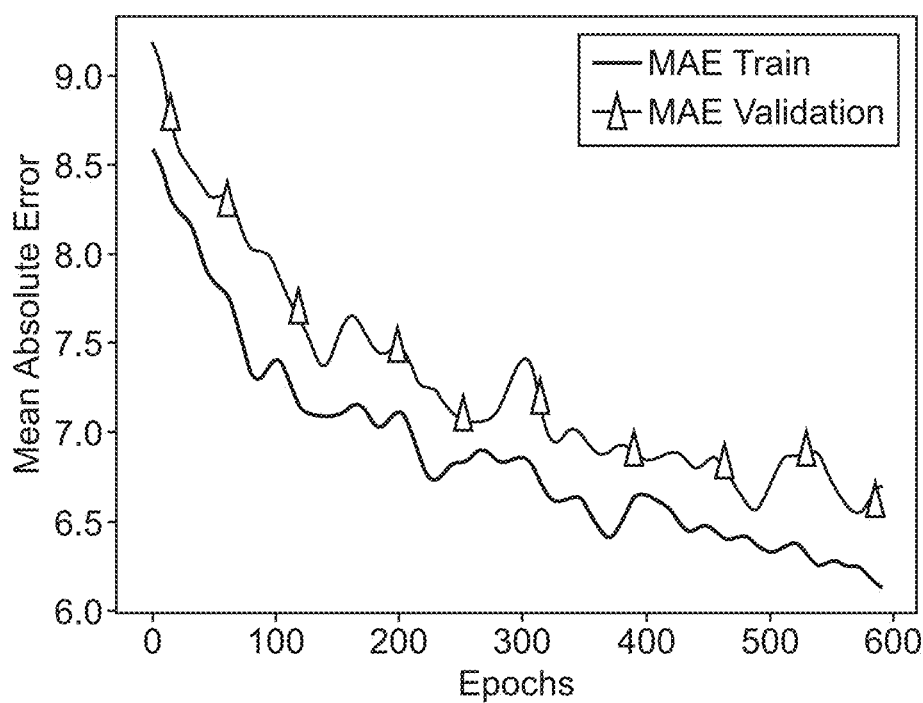
FIG. 3 represents the decrease of the Mean Absolute Error of the initial network during the training for the training set and validation set.

On FIG. 3 are represented the mean absolute errors respectively on a training set and a validation set of the initial neural network, according to the number of training sessions (or epochs). The curves on FIG. 3 have been smoothed.

One can see that the mean absolute errors decrease with the number of training session. However, as the initial neural network is trained for age estimation, a too important learning may make this network highly specific and less relevant for the desired application which is outputting a score representative of a qualitative feature.

Therefore, back to FIG. 1, the method comprises a step 200 of evaluating, for each updated version of the initial neural network, i.e. for each version of the initial neural network which weighting coefficients have been updated after a training session, an error of a part of said updated initial neural network on the estimation of the qualitative feature.

In an embodiment, this step may be performed after each training session, so that steps 100 and 200 are performed iteratively one after the other. In another embodiment, the weighting coefficients after each training session are stored for all the training sessions, and are then loaded for each error evaluation. In that case step 100 is performed once for all the training sessions, and step 200 is also performed once after step 100.

Said part of the updated initial neural network is preferably the feature extraction part described previously.

The evaluation step is performed by adding, at the output of the part of the neural network to be evaluated, an estimator outputting a score representative of the qualitative feature to be assessed from the features extracted by the part of the neural network. In a preferred embodiment, the estimator is a linear regression.

The linear regression is trained on a second database comprising face images associated with a score representative of the qualitative feature to be assessed. In this database, the score has typically been provided by a group of raters. Therefore this second database is of smaller size than the first, and may comprise only up to one or several hundreds of images and associated scores.

Given this very small size of the second database, the linear regression is trained by k-fold cross validation, where k is chosen between 2 and N with N the number of images in the database. For instance with a database of 130 images, k may be equal to 20.

Therefore step 200 comprises dividing the second database into k subsets of roughly the same size, and then, for each updated version of the initial neural network obtained after a training session, and for each of the k subset:
  selecting a subset,
  for each image of the second database not included in the subset, extracting a respective set of features by applying the part of the initial neural network,
  determining a regression function between each set of features extracted from an image and the score associated to the image,
  for each image of the subset, applying said part of the initial neural network to extract a set of features,
  applying the regression function to each set of features to infer an estimated score, and
  computing an overall error between each estimated score and the corresponding score associated to the image.

The error outputted at step 200 for each updated version of the initial neural network is computed based on the errors computed for each of the k subsets. For instance it is the Mean Absolute Error of all the errors computed for each of the k subsets.

Figure 4:
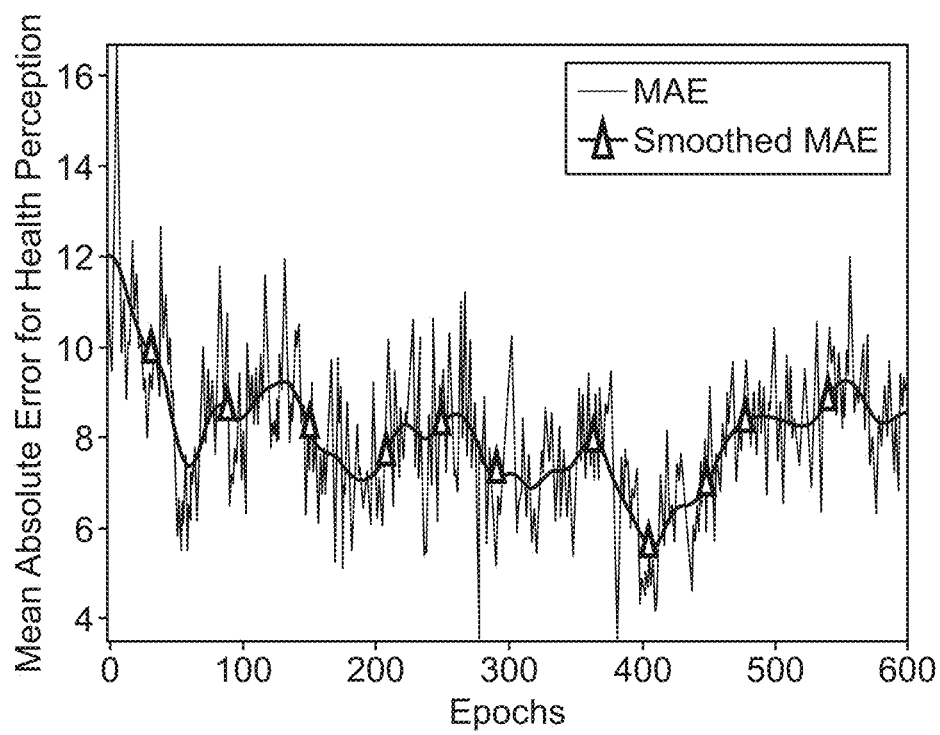
FIG. 4 represents the evolution of the Mean Absolute Error for health perception of the extracted part of the initial network with the trained versions of the initial network, FIG. 5 schematically represents a tool obtained with the method.

On FIG. 4 is shown an example in which the mean absolute error is represented for each training session, and another curve is the smoothed mean absolute error.

One can notice that the smoothed mean absolute curve starts decreasing with the training 100 of the initial neural network, and then increases again, for after an important number of training sessions, the initial neural network becomes too specific to the task of age estimation.

The method then comprises a step 300 of selecting as the neural network of the tool for assessing the qualitative feature, the part (e.g. feature extraction part) of the initial neural network in the updated version which exhibits the lowest error at step 200. In other words, step 300 comprises selecting the part of the initial neural network with the weighting coefficients providing the minimum error on the assessment of the qualitative feature.

In the example shown in FIG. 4, the version that is selected is around the $410^{th}$ training session or epoch.

Once the neural network N of the tool is determined, the method then comprises a step 400 of determining the best estimator to infer, from the features extracted by the neural network N, a score representative of the qualitative feature to be assessed.

This step 400 is performed by training 410, by k'-fold cross validation, on the second database, a plurality of candidate estimators, to infer for each estimator a mean absolute error between the score outputted by the estimator and the score assigned to each picture of the database. During this step k' is preferably equal to k used in step 200. Thus k' may for example be equal to k. Then step 400 comprises choosing 420 the candidate estimator exhibiting the lowest mean absolute error.

The candidate estimators may comprise a linear regression, a Ridge regression, a Lasso regression, etc. They also may comprise several versions of a same type of regression with different parameters. They also may comprise another neural network configured to output a score from the extracted features.

One example is detailed in Table 1 below, in which three candidate estimators have been tested on a second database comprising 130 images annotated with health scores. One can see that the best estimator is Ridge regression with $\alpha=10^{-3}$, $\alpha$ being the penalty coefficient for $L_2$ regularization.

TABLE 1

| Mean Absolute Errors associated with candidate estimators | |
|---|---|
| Estimator | Mean Absolute Error |
| Linear Regression | 4.230 |
| Ridge regression with $\alpha = 10^{-3}$ | 4.221 |
| Ridge regression with $\alpha = 10^{-1}$ | 4.257 |
| Ridge regression with $\alpha = 10^{0}$ | 5.879 |
| Ridge regression with $\alpha = 10^{1}$ | 10.913 |
| Lasso regression with $\alpha = 10^{6}$ | 15.031 |
| Lasso regression with $\alpha = 10^{5}$ | 8.321 |
| Lasso regression with $\alpha = 10^{3}$ | 10.096 |
| Lasso regression with $\alpha = 10^{2}$ | 13.022 |

It is to be underlined that the very scarce number of images in the second database (e.g. 130) brings simple estimators such as linear regression of Ridge regression to outperform more complex estimators such as neural networks.

With reference to FIG. 5, the tool obtained by the method comprises a first block which is a neural network N configured to extract features from a face image, and a second block which is an estimator E configured to output a score representative of the qualitative feature from the features extracted by the neural network.

With this tool, it is no longer necessary to have a picture reviewed by tens of raters in order to obtain a score of perceived health or another qualitative feature. Instead it only requires processing the picture with the tool and outputting the score.

Figure 6A:
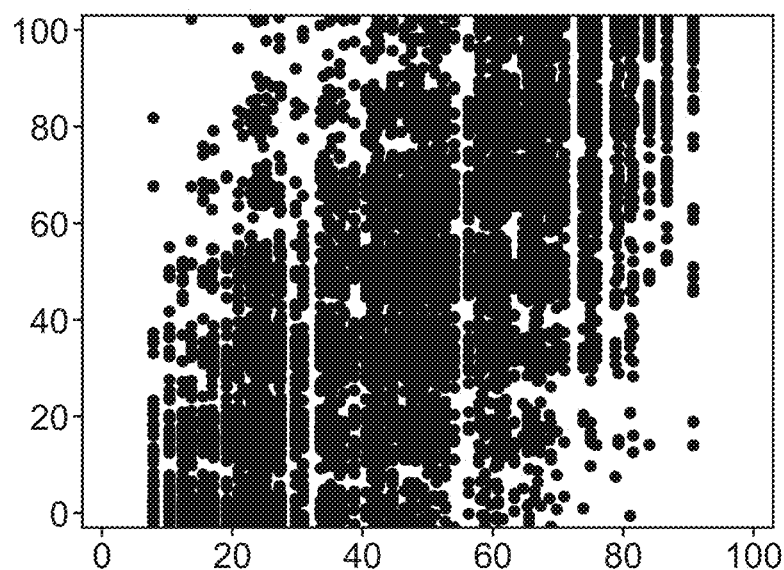
FIGS. 6a and 6b represent the performance of health perception performed respectively by a tool according to an embodiment and by reviewers.
Figure 6B:
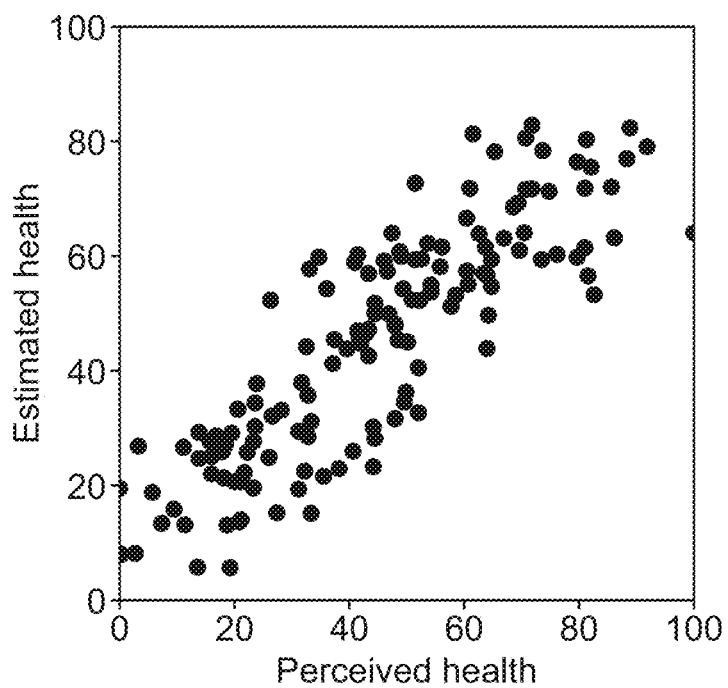

The comparative results are shown in FIGS. 6a and 6b. FIG. 6a shows the results of the evaluation of health from pictures of Caucasian females by a set of Caucasian raters. In abscissa are shown the average scores attributed to pictures, and in ordinates are shown the individual scores given by each rater. This figure thus illustrates the performance of a single rater relative to the average of raters. The coefficient of determination R2 in this case is −0.387 and the Pearson correlation coefficient is of 64.7%.

FIG. 6b shows the predictions of the tool (in ordinates) compared to the average health scores attributed by raters. The coefficient of determination is then R2=0.722 and the Pearson correlation coefficient is 85.1%. Therefore it appears that the tool developed according to the method given above exhibits a better precision that a human rater. Additionally, with this tool a database of face images and corresponding scores can be enriched.

The face images already present in the database may be used to build new face images, for instance by picking the eyes from one picture, the nose from another, etc. The tool may then be run on the newly created picture to infer a corresponding score of perceived health or other qualitative feature, and the picture and corresponding score may be added to the database.

Larger databases can therefore be made available for further research.

The invention claimed is:

1. A method for building a tool adapted to determine, from processing of a picture of a human face, a score representative of a qualitative feature of the face, the tool comprising a neural network (N), wherein the method is performed by a computer and comprises steps of:

training, by performing at least one training session, of an initial neural network configured to assess, from a picture of a face of a person, an estimated age of the person, the initial neural network comprising a feature extraction part (FP) configured to extract features from the picture of the face, and an age evaluation part (EP) configured to output the estimated age from the extracted features, wherein the initial neural network comprises layers of neurons and associated weights, and each training session is performed on a first database of face images in which each face image is associated with a biological age of the person on the image, and each of the at least one training session outputs an updated version of the initial neural network in which the weights are changed, for each updated version of the initial neural network corresponding to a respective one of the at least one training session, determining an evaluated error by evaluating an error of the feature extraction part (FP) of the initial neural network on a second database of face images in which each face image is associated with a reference score representative of the qualitative feature, the second database having a size inferior to the first database, and from the evaluated error of each updated version of the initial neural network determining one updated version of the initial neural network having a minimum one of the evaluated error, and a first selecting step of selecting as the neural network (N) of the tool, said feature extraction part (FP) of the one updated version of the initial neural network having the minimum evaluated error on the second database of face images in which each face image is associated with the reference score representative of the qualitative feature, and after the first selecting step, a second selecting step of selecting an estimator among a plurality of estimator candidates, which minimizes an average error, between a score estimated by the estimator and the corresponding reference score for each image of the second database.

2. The method according to claim 1, wherein the step of evaluating the error of the feature extraction part (FP) comprises training a linear regression between an output of a part of the initial neural network for a face image and a score associated to the image.

3. The method according to claim 2, wherein the training of the linear regression is performed by a k-fold cross-validation.

4. The method according to claim 3, wherein k is comprised between 2 and N, where N is the number of images in the second database.

5. The method according to claim 1, wherein each estimator candidate is trained k'-fold configuration.

6. The method according to claim 1, wherein the estimator candidates comprise at least one of a linear regression, a Ridge regression, a Lasso regression, or a neural network.

7. The method according to claim 1, wherein the qualitative feature is one among the following: health estimation, attractiveness estimation, gender estimation, self-confidence estimation, and femininity estimation.

8. A computer program product, comprising a set of instructions for performing the method according to claim 1, when executed by a processor.

9. A tool for assessment of a qualitative feature from a picture of a human face, comprising a neural network (N) adapted to process the picture to extract features, and an estimator (E) adapted to infer, from the extracted features, a score representative of the qualitative feature, characterized in that it is built according to claim 1.

10. A computer-implemented method for assessing a qualitative feature from a picture of a human face, comprising the application, to the picture, of a tool according to claim 9 to output a score representative of the qualitative feature.

11. A method according to claim 10, wherein the picture is a face image built from parts of images of the second database, and the method further comprises adding the picture and corresponding score to the second database.

* * * * *